US012791260B2

(12) United States Patent
Deshpande et al.

(10) Patent No.: US 12,791,260 B2
(45) Date of Patent: Nov. 10, 2026

(54) METHOD OF FORMING LAMINATED HEAT EXCHANGERS

(71) Applicant: HS Marston Aerospace Limited, Wolverhampton (GB)

(72) Inventors: Aditya Deshpande, West Midlands (GB); Philip Seward, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 225 days.

(21) Appl. No.: 18/623,434

(22) Filed: Apr. 1, 2024

(65) Prior Publication Data

US 2024/0247876 A1 Jul. 25, 2024

Related U.S. Application Data

(62) Division of application No. 16/671,568, filed on Nov. 1, 2019, now Pat. No. 11,976,888.

(30) Foreign Application Priority Data

Nov. 2, 2018 (EP) .................................... 18275169

(51) Int. Cl.

*B21D 53/04* (2006.01)
*B23P 15/26* (2006.01)
*F28D 9/00* (2006.01)
*F28F 3/08* (2006.01)

(52) U.S. Cl.

CPC ........... *F28D 9/0093* (2013.01); *B21D 53/04* (2013.01); *B23P 15/26* (2013.01); *F28D 9/0056* (2013.01); *F28F 3/08* (2013.01)

(58) Field of Classification Search

CPC .......... B23P 15/26; B21D 53/02; B21D 53/04
See application file for complete search history.

(56) References Cited

U.S. PATENT DOCUMENTS

| | | | |
|---|---|---|---|
| 3,334,399 A | 8/1967 | Teeguarden |
| 4,162,703 A | 7/1979 | Bosaeus |
| 4,217,953 A | 8/1980 | Koike et al. |
| 4,258,785 A | 3/1981 | Beldam |
| 4,969,512 A | 11/1990 | Hisao et al. |
| 5,604,981 A | 2/1997 | Frazier et al. |

(Continued)

FOREIGN PATENT DOCUMENTS

| | | |
|---|---|---|
| DE | 102006048667 A1 | 4/2008 |
| EP | 3348976 A1 | 7/2018 |

(Continued)

OTHER PUBLICATIONS

Extended European Search Report for International Application No. 18275169.3 dated May 10, 2019, 7 pages.
FR2906017A1 Abstract, 1 pg.

*Primary Examiner* — Sarang Afzali
(74) *Attorney, Agent, or Firm* — CANTOR COLBURN LLP

(57) ABSTRACT

A heat exchanger for allowing heat to be exchanged between a first fluid and at least one other fluid. The heat exchanger includes at least one flow path and a manifold in communication with the at least one flow path. The manifold includes a void formed in the core and includes end caps. At least one of the end caps is a non-flat end cap.

3 Claims, 4 Drawing Sheets

(56) References Cited

U.S. PATENT DOCUMENTS

| | | | | |
|---|---|---|---|---|
| 7,195,060 | B2 * | 3/2007 | Martin | F28D 9/0043 165/157 |
| 8,960,269 | B2 | 2/2015 | Cheadle et al. | |
| 9,664,144 | B2 | 5/2017 | Vallee et al. | |
| 9,664,449 | B2 | 5/2017 | Kinder et al. | |
| 10,048,014 | B2 | 8/2018 | Bader et al. | |
| 2001/0017200 | A1 | 8/2001 | Noishiki et al. | |
| 2003/0079871 | A1 | 5/2003 | Samy et al. | |
| 2008/0216987 | A1 | 9/2008 | Thumm et al. | |
| 2009/0260786 | A1 * | 10/2009 | Palanchon | F28F 9/02 165/176 |
| 2010/0006275 | A1 | 1/2010 | Arvidsson | |
| 2010/0243200 | A1 | 9/2010 | Baker, Jr. et al. | |
| 2013/0200611 | A1 | 8/2013 | Lemee et al. | |
| 2013/0287379 | A1 | 10/2013 | Yoshitomi et al. | |
| 2015/0007970 | A1 | 1/2015 | Bader et al. | |
| 2015/0260459 | A1 * | 9/2015 | Cameron | F28F 3/022 29/890.03 |
| 2018/0045471 | A1 | 2/2018 | Dietrich | |
| 2020/0141657 | A1 | 5/2020 | Deshpande et al. | |

FOREIGN PATENT DOCUMENTS

| | | | |
|---|---|---|---|
| FR | 2906017 | A1 | 3/2008 |
| FR | 3004527 | A1 | 10/2014 |
| JP | H1163727 | A | 3/1999 |
| WO | 2011039563 | A1 | 4/2011 |
| WO | 2013122529 | A1 | 8/2013 |

* cited by examiner

METHOD OF FORMING LAMINATED HEAT EXCHANGERS

CROSS REFERENCE TO RELATED APPLICATIONS

This application is a divisional of U.S. Pat. No. 11,976,888 filed Nov. 1, 2019, which claims priority to European Patent Application No. 18275169.3 filed Nov. 2, 2018, the entire contents of which are incorporated herein by reference.

BACKGROUND

The present disclosure relates to a laminate heat exchanger, particularly for use in aerospace applications.

A typical heat exchanger comprises a core that has a plurality of first flow paths and a plurality of second flow paths. The first flow paths are in communication with a manifold that communicates a first fluid (such as oil or another liquid) through the first flow paths. The second flow paths are arranged to allow a second fluid (such as air or another gas) to pass through the heat exchanger. The first and second flow paths are generally planar and are arranged in a stacked arrangement, where second flow paths are located above and below a given first flow path, and first flow paths are located above and below a given second flow path, with an alternating sequence up until the ends of the stack, which may be a top and bottom of the stack when the heat exchanger is oriented with the flow paths generally horizontal. This arrangement attempts to maximise the amount of heat exchanged between the first and second fluids.

The flow paths are kept separate via separating plates that allow heat to transfer between the first and second flow paths, but prevent the mixing of fluids. To assist the transfer of heat, it is known to provide additional features, such as fins or pins, in the first and/or second flow paths.

The known heat exchangers also comprise a manifold that is in fluid communication with the first flow paths but not in fluid communication with the second flow paths. The manifold can supply and/or receive the first fluid to and/or from the core. The second fluid may flow across the width of the heat exchanger entering via a manifold or tank at one side and exiting via a manifold or tank at the other side.

The core typically is made by forming a stack of components. This is achieved by first providing a base plate. On top of the base plate, enclosure bars for the first fluid path and heat exchanging elements are placed. On top of these, a separating plate is placed. On top of this, enclosure bars for the second fluid path are placed, and a fin component (such as a corrugated sheet) may be placed. On top of this, a separating plate is placed. This is repeated until the stack of a desired size is formed. To finish the stack, on top of the upper-most enclosure bars and the upper-most fin component, a top plate is placed. The stack is then brazed together to form the core.

SUMMARY

Viewed from a first aspect, the invention provides a heat exchanger for allowing heat to be exchanged between a first fluid and at least one other fluid, the heat exchanger comprising: a core comprising: at least one flow path; a manifold in communication with the at least one flow path; wherein the manifold comprises a void formed in the core; and the manifold comprises end caps, wherein at least one of the end caps is a non-flat end cap.

The term "non-flat" means that the end cap is not flat, even when the heat exchanger is not in operation. That is to say, the end cap has been deliberately formed with a radius of curvature during manufacture of the end cap and the ratio of the length of the arc formed by the end cap curve and the chord of the curve is substantially greater than 1.

Existing laminated liquid-liquid and gas-liquid heat exchangers have flat end plates, which results in flat manifold end caps. The manifolds act as pressure vessels when in use, and a flat end cap results in a potential weak spot due to non-uniform distribution of stresses. With increasing pressure and temperature requirements the trend has been for flat end plates to become thicker in order to contain higher pressures and accommodate increased stresses. This results in heavier laminated heat exchangers, which can lead to disadvantages such as increased fuel usage when such a heat exchanger installed in an aero engine or any vehicle. Moreover, thick flat end plates and end caps still have non-uniform stress distributions which results in the flat end cap being a weak region of the heat exchanger regardless of the thickness of the end plate and end cap.

The manifold comprises a void within the core and hence should be differentiated from prior art heat exchangers manufactured by forming the manifold separately and attaching the manifold to the outside of the core. The core and the manifold may be formed as one integral piece, wherein the manifold is formed as a void within the one-piece core.

In some examples the core has a first end, a second end, a first side, and a second side. Thus, the core may have a generally rectangular cross-section. The core may be generally cuboid in shape, although it will be appreciated that other shapes can be used with the manifold arrangement proposed herein, such as curved shaped cores and so on.

The core may comprise a plurality of laminate members stacked together. A heat exchanger comprising a core formed from a plurality of laminate members is typically known as a laminate heat exchanger. Thus, the heat exchanger may be a laminate heat exchanger. The plurality of laminate members may comprise laminate members of differing functions such as: a plurality of fluid enclosures arranged to at least partially define the at least one flow path; at least one separating plate for separating each of the plurality of fluid enclosures; and end plates for enclosing the ends of the stack. In some examples the fluid enclosures may be integrated with separating plates. Each fluid enclosure may comprise a manifold section, enclosure bars, and optionally a separating plate.

The void may be formed in the core by stacking laminate members having a void portion, the void portion being provided during the formation of the laminate members prior to the stacking. During the stacking then the void portions may align and combine to form the void. Where the laminate members include fluid enclosures with a manifold section then the manifold section may be formed to include an opening providing the void portion. Alternatively, the laminate members may be formed without a void portion with the void portion being formed after the stacking step by subtractive manufacturing steps, for example by machining the stack of laminate members. The laminate members may be formed by additive manufacturing. In some cases, such as with the use of additive manufacturing, the laminate members may have a void portion requiring additional machining to remove undesired material after the stacking of laminate members. It will be appreciated that with this construction of the void the end cap seals an open end of the void. In example embodiments the void extends fully through the stack and is then sealed using end caps at each end of the stack in order to complete the manifold.

An advantage of forming the core and manifold from laminate members is that each laminate member may be easily manufactured and shaped to the specific needs of certain heat exchangers and eliminate welding of manifolds to the core.

The plurality of laminate members may also comprise heat exchanging elements, such as fins, for the facilitation of efficient heat exchange between fluids. The heat exchanging elements may be provided as separate elements, for example as finstock to be placed within suitable spaces in fluid enclosures. Alternatively, the heat exchanging elements such as pins may be integrated into a separating plate or any other laminate member.

The laminate members may be produced by cold forming, hydroforming, additive manufacturing, subtractive manufacturing, or any other suitable forming method.

The manifold may comprise manifold features for allowing the first fluid to be supplied to and/or received from the at least one flow path. In the case where the core is formed from laminate members with manifold sections then the plurality of manifold sections may each comprise respective features that form the manifold features when the plurality of laminate members are stacked.

The manifold features may comprise a supply plenum and a return plenum for, respectively, supplying and returning a fluid to and from the at least one flow path. In one embodiment, the supply plenum may be disposed at the first end of the core and the return plenum may be disposed at the second end of the core. Alternatively, the supply plenum and the return plenum may both be disposed at the same end of the core, wherein the plena are separated by a plenum wall.

The lengthways cross-section of one or both of the manifold plena may be elliptical, rounded rectangular, or stadium-shaped. The widthways cross-section of one or both of the manifold plena may be spherical, elliptical, rounded rectangular, stadium-shaped, or any other suitable shape. The supply plenum and the return plenum may have the same shape and/or may be symmetric in shape.

The non-flat end cap(s) may be formed separately to the core and joined to the core by any suitable means. Thus, the core may comprise one or more end plate(s) and separate manifold end cap(s). For example, the end cap(s) may be bonded to the end plate(s), such as by brazing.

Alternatively, at least one of the end plates may integrally comprise the non-flat end cap(s). The non-flat end caps may be formed as a protrusion from an otherwise flat surface of the end plate.

The non-flat end cap(s) may be ellipsoidal, torispherical, hemispherical, or any other suitable curved shape enabling enhanced pressure and/or stress distribution compared to a flat end cap of similar material and similar thickness.

The end cap(s) may be made by cold forming, hydroforming, additive manufacturing, subtractive manufacturing, or any other suitable forming method and may be formed as part of an end plate using such forming methods. In one example an end plate incorporating the non-flat end cap(s) is manufactured via cold forming.

An advantage of a non-flat end cap is a distribution of pressure across the end cap, resulting in a diminished structural weakness in the end cap. That is, the non-flat end cap allows stresses in the end cap to be more uniformly distributed across the end cap than if the end cap were flat.

The heat exchanger may comprise at least one flange for aiding in mounting the heat exchanger to other components, wherein the manifold, the core and the at least one flange are formed as one integral piece, such as via the stack of laminate members, wherein some or all of the laminate members comprise respective flange portions, wherein the flange portions are shaped to form the parts of the at least one flange when the plurality of laminate members are stacked. Thus, flange portions of the laminate members (for example flange portions of the fluid enclosure structures and/or separating plates) may align during the stacking in order to form sides of the flange extending along corners of the core between the end plates. In this case the end plates may include a flange section extending along the length of the end plates and hence along the length of the core between the sides of the flange formed by the flange portions of the laminate members.

The flange may comprise holes for receiving an attaching means, such as bolts or other mechanical fixings, for mounting the heat exchanger to other components. The holes may be formed in the flange after the core has been formed, for example by a subtractive manufacturing step forming holes in the flange after stacking of laminate members.

In examples with a flange the non-flat end cap(s) advantageously do not protrude above the extent of the flange sections of the end plates. In other words, the height of the flange portions of the end plates may be greater than the height of the end caps. Thus, the non-flat end cap(s) may sit within a "space" provided by the flange, and in this way the advantages arising from the use of non-flat end caps can be realised without increasing the total space required to enclose the heat exchanger.

By having flange portions of the end plates having a greater height than the height of the non-flat end caps then the non-flat end caps fit within the same shape as the heat exchanger, for example within a generally cuboidal shape, allowing for easier stacking of components.

The heat exchanger may allow heat to be exchanged between a first fluid and a second fluid, the core comprising; a first flow path and a second flow path; wherein the manifold is in communication with the first flow path. The first fluid may hence be supplied and/or received to and/or from the core by the manifold. The second fluid may flow through the second flow path. In some examples the first flow path across the width of the heat exchanger, entering via a manifold or tank at one side of the heat exchanger and exiting via a manifold or tank at the other side of the heat exchanger.

In typical examples, as described above, heat is exchanged between two fluids in the heat exchanger core as described above. While many conventional heat exchangers would typically allow heat exchange between only two fluids, it will be appreciated that a heat exchanger may be modified to exchange heat between three or more fluids, i.e. by forming additional fluid flow paths in the core. In that case there may be additional manifolds for the further fluid flow paths, with those manifolds advantageously included voids formed within the core and non-flat end caps.

As noted above heat exchanging elements such as fins, may be provided. The fins may include corrugations or fin pins for example. Different types of fins may be used, for example a hybrid arrangement may use a non-pin fin arrangement for one fluid and a pin fin arrangement for another fluid. In one example fin pins are used for the first fluid which may be a liquid. It has been found that advantages arise from this combination of features. The second fluid, with a flow path having the non-pin fins, may be a gas.

The heat exchanger may be for use in an aircraft. For instance, it may be for use in an aircraft engine, or possibly in an air and oil management system in an aircraft.

The heat exchanger may be for use with a first fluid having a temperature that can vary between −40° C. to 210° C. The fin-plate heat exchanger may be for use with a second fluid having a temperature that can very between −50° C. to 100° C. The heat exchanger may be for use with a first fluid having a pressure that can vary between 3 kPa to 150 kPa. The heat exchanger may be able to function over both of these ranges, and possibly beyond.

The heat exchanger may comprise the first and second fluids. The first fluid may be a liquid, such as oil and the second fluid may be a gas, such as air or exhaust gas.

The invention further extends to a method of manufacturing a heat exchanger as in the first aspect, wherein the method comprises: forming a core providing a void within the core; using end caps to seal the void, wherein the void and the end caps together form a manifold, and wherein at least one of the end caps is a non-flat end cap.

The method may include providing the heat exchanger with any of the features discussed above in relation to the first aspect and optional features thereof. The method may comprise forming the core by: stacking laminate members and end plates, and joining the laminate members and the end plates together. The laminate members may be joined to form the core as one integral piece. The laminate members and end plates may be joined using a brazing process or any other suitable method.

The method may further comprise: providing a first end plate; providing a stack of laminate members on top of the first end plate, wherein the laminate members are configured to allow heat exchange between at least two fluids; providing a second end plate on top of the stack of laminate members; and joining the first and second end plates and the stack of laminate members.

The first end plate and the second end plate may be, respectively, known as the base plate and the top plate.

The method may comprise removing excess material from the core after the joining process. This may also be used to generate interface features, such as fluid inlets and outlets, which allow the completed heat exchanger to interface with other components. The heat exchanger may include a flange as discussed above and the method may comprise forming holes in the flange after the core is formed.

The void may be formed as described above. For example, the void may be formed in the core by providing laminate members with a void portion and then stacking the laminate members with the void portions aligning and combining to form the void. Alternatively, the laminate members may be formed without a void portion with the void portion being formed after the stacking step by subtractive manufacturing steps, for example by machining the stack of laminate members. The laminate members may be formed by additive manufacturing. In some cases, such as with the use of additive manufacturing, the laminate members may have a void portion requiring additional machining to remove undesired material after the stacking of laminate members. It will be appreciated that with this construction of the void the end cap seals an open end of the void. In example embodiments the void extends fully through the stack and is then sealed using end caps at each end of the stack in order to complete the manifold.

BRIEF DESCRIPTION OF THE DRAWINGS

Certain embodiments of the invention will now be described by way of example only and with reference to the accompanying drawings in which.

DETAILED DESCRIPTION

Figure 2:
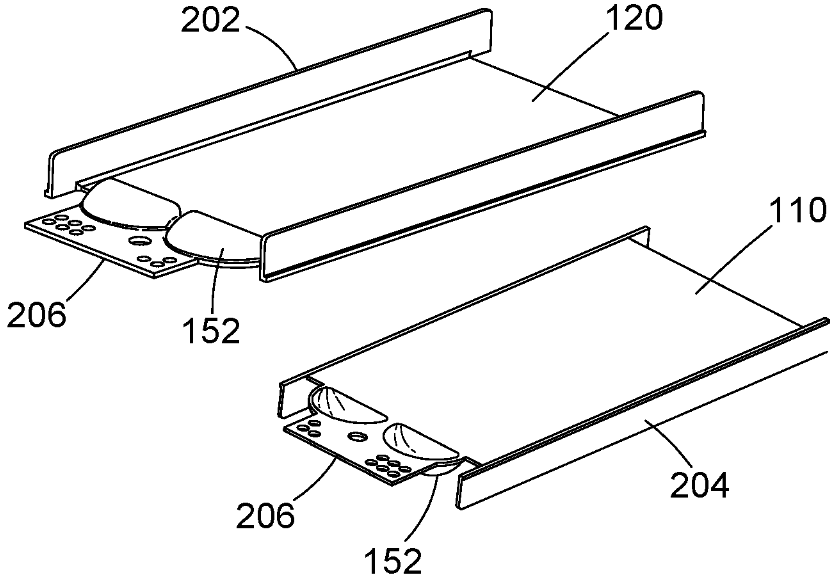
FIG. 2 shows end plates having integral end caps.

Although the "end plates" are referred to as a "base plate" and a "top plate" below, the particular orientation alluded to by the naming of these plates is in relation only to the orientation shown in the figures and has no bearing on the final orientation of the completed product either before or after installation. The skilled person would understand that a heat exchanger 1 may be oriented as shown in the figures or may be rotated through any angle in any direction. The skilled person would then understand that the base plate 110 and top plate 120 as shown in FIG. 2 are simply end plates of the heat exchanger 1 and are not restricted to the orientation depicted in the figure.

Figure 1:
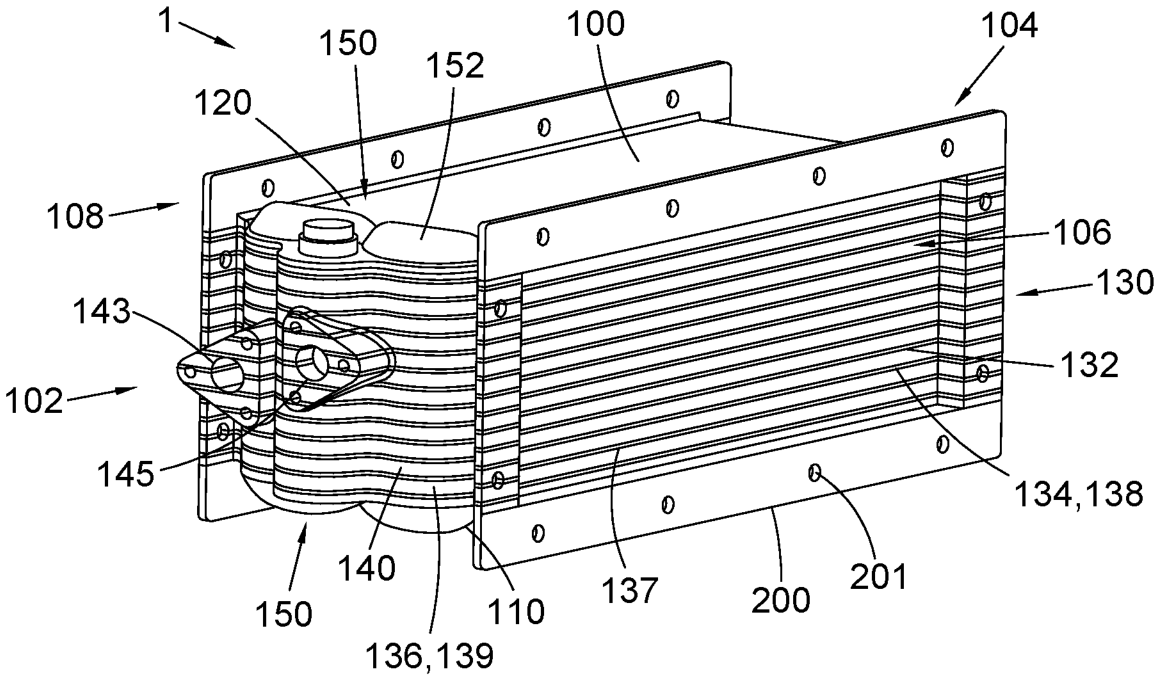
FIG. 1 shows a the heat exchanger.

Turning to FIG. 1, a heat exchanger 1 comprises a core 100. The core 100 comprises end plates 110, 120 and a stack 130, where the stack 130 is between the end plates 110, 120. The stack 130 is formed from a plurality of separating plates 132, a plurality of first enclosure structures 134, and a plurality of second enclosure structures 136. First enclosure structures 134 act in cooperation with the separating plates 132 to define a plurality of first flow paths 138 for a first fluid. Second enclosure structures 136 act in cooperation with the separating plates 132 to define a plurality of second flow paths 139 for a second fluid.

The plurality of first enclosure structures 134 comprise a plurality of first fluid transfer elements (not shown) and the plurality of second enclosure structures 136 comprise a plurality of second fluid transfer elements 137. The first and second fluid transfer elements may be pins or fins or any other suitable structure for facilitating heat transfer.

The core 100 of the heat exchanger 1 also comprises a manifold 140, the manifold 140 being formed from a void 141 within the stack 130 and from end caps 150.

The manifold 140 comprises manifold features, such an inlet 143 and an outlet 145 for supplying and returning, respectively, the first fluid from the first fluid flowpaths. The manifold is supplied with the first fluid via the inlet 143. The first fluid exits the manifold via the outlet 145. In this example the inlet 143 and outlet 145 are on the same end of the heat exchanger 1.

The heat exchanger 1 also comprises flanges 200. The flanges 200 are for facilitating the interfacing of the heat exchanger 1 with adjacent components. The flanges 200 may comprise holes 201. The holes 201 may be formed by drilling, water cutting, or any other suitable method. Typically the holes 201 are formed after the formation of the core 100. The holes 201 allow the heat exchanger 1 to be attached, using bolts, for example, to other components such as air ducts.

The core 100, manifold 140, and flanges 200 are formed as one integral piece. The end plates 110, 120 may also provide end caps 150 for the manifold 140. Alternatively, the end plates 110, 120 may be formed without end caps 150. In the latter case, end caps 150 may be formed separately and joined to the integral piece.

The integral piece comprises a plurality of laminate members 110, 120, 132, 134, 136. The integral piece has a first end 102, a second end 104, a first side 106, and a second side 108.

The plurality of laminate members 110, 120, 132, 134, 136 includes end plates 110, 120, the plurality of separating plates 132, the plurality of first enclosure structures 134, and the plurality of second enclosure structures 136.

The manifold is formed towards the first end 102 of the integral piece. The manifold 140 has end caps 150, wherein at least one of the end caps 150 forms a curved manifold end 152. In this example each of the end caps 150 is a curved manifold end 152, i.e. all of the end caps 150 are non-flat end caps. The curved manifold end 152 may be made as a separate end cap 150 and then joined to one of the end plates 110, 120. Alternatively, as shown in the Figures, the curved manifold ends 152 may be formed as parts of the end plates 110, 120.

FIG. 2 shows end plates 110, 120 having curved manifold ends 152 formed integrally therein. End plates 110, 120 may also be known as a base plate 110 and a top plate 120. Both of the base plate 110 or the top plate 120 may have a curved manifold end 152 formed integrally therein. Therefore, the complete core 100 has a base plate 110 having a curved manifold end 152 and a top plate 120 having a curved manifold end 152.

The curved manifold end 152 can be formed as a protrusion from an otherwise flat end plate 110, 120, as shown in the Figures.

The end plates 110, 120 are formed with flange portions 202, 204. The flange portions 202, 204 form part of a complete flange 200 when the end plates 110, 120 are joined to the stack of laminate members to complete the core 100. The flanges 200 are proximate the first and second sides 106, 108 of the core 100.

The curved manifold ends 152 shown in the figures are generally torispherical. However, the curved manifold end 152 may be shaped to be ellipsoidal, hemispherical, or any other suitable curved shape enabling enhanced pressure and/or stress distribution over the non-flat end caps 150 compared to a flat end cap (e.g. as provided by a flat end plate). The skilled person would appreciate that the shape of the curved manifold end 152 may differ to suit differences in the shape of the manifold 140. Thus, the shape depicted in the figures is intended to be exemplary and non-limiting to any particular curved shape.

An extension 206 may be formed during the manufacturing stage of an end plate 110, 120. The extension 206 lies in the plane of the end plate 110, 120. The purpose of the extension 206 will be elaborated on below.

The end plates 110, 120 may be formed by cold forming, hydroforming, additive manufacturing, subtractive manufacturing, or any other suitable forming method. Depending on the forming method used, the curved manifold ends 152 may require additional machining to remove excess material.

Figure 3A:
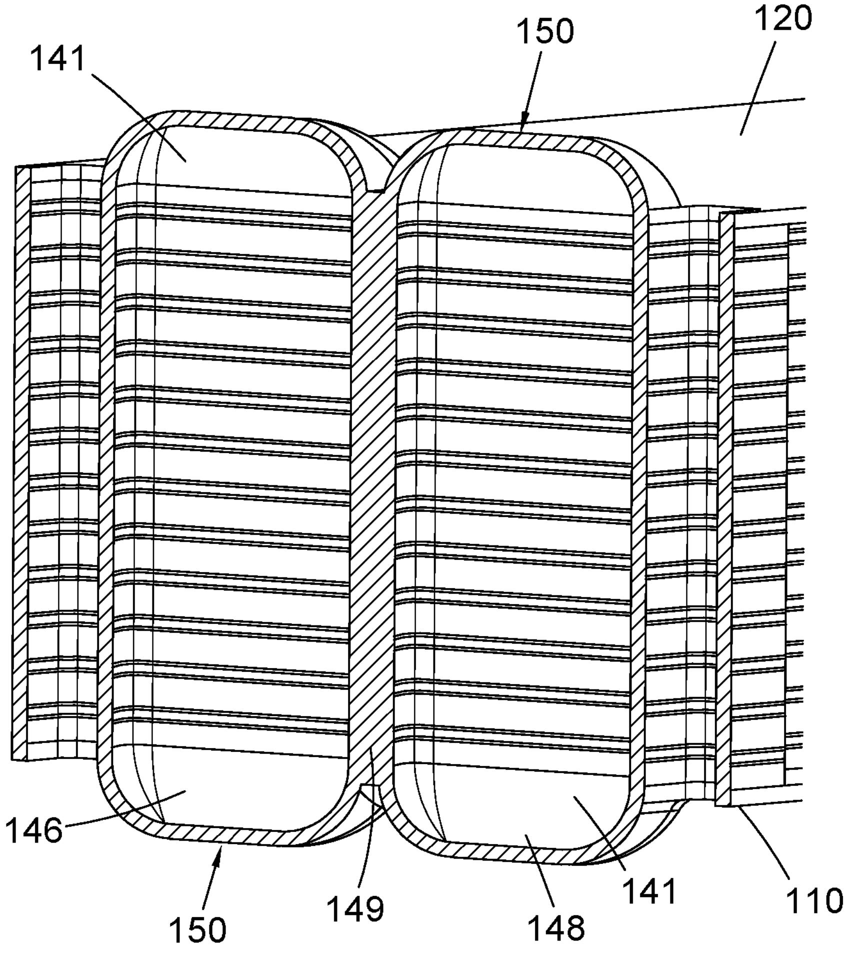
FIG. 3A shows a cross-section of the integral manifold in a heat exchanger.
Figure 3B:
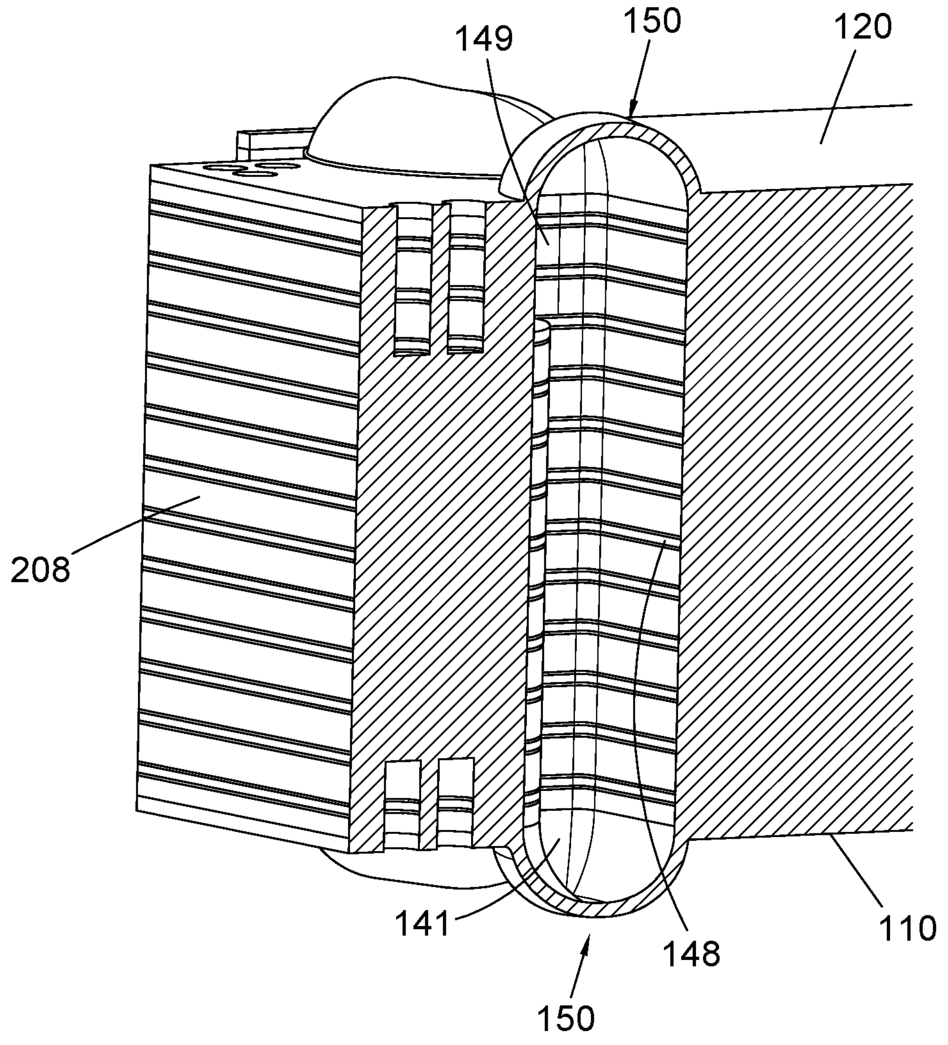
FIG. 3B shows a different cross-section of the integral manifold.

FIGS. 3A and 3B show cross-sections of a heat exchanger manifold 140 as viewed from the first end 102 and the first side 106, respectively, of the integral piece. The heat exchangers shown in FIGS. 3A and 3B have a core 100 comprising end plates 110, 120 that both integrally contain curved manifold ends 152.

The manifold 140 comprises two plena: a supply plenum 146 and a return plenum 148. The supply plenum 146 is in fluid communication with the first fluid paths and is for supplying the first fluid to the fluid paths. The return plenum 148 is in fluid communication with the first fluid paths and is for returning the first fluid from the first fluid paths. The plena 146, 148 are separated by a plenum wall 149. The supply plenum 146 is in fluid communication with inlet 143. The return plenum is in fluid communication with outlet 145.

The supply plenum 146 has supply end caps 150. The supply plenum end caps 150 may be formed as part of the end plates 110, 120. At least one of the supply plenum end caps 150 may be part of a curved manifold end 152. The supply plenum end cap 150 that is part of the at least one curved manifold end 152 may be shaped to be ellipsoidal, torispherical, hemispherical, or any other suitable curved shape enabling enhanced pressure and/or stress distribution over the supply plenum end cap 150.

Similarly, the return plenum 148 has return plenum end caps 150. The return plenum end caps 150 may be formed as part of the end plates 110, 120. At least one of the return plenum end caps 150 may be part of a curved manifold end 152. The return plenum end cap 150 that is part of the at least one curved manifold end 152 may be shaped to be ellipsoidal, torispherical, hemispherical, or any other suitable curved shape enabling enhanced pressure and/or stress distribution over the return plenum end cap 150.

The lengthways cross-section of at least one of the manifold plena 146, 148 may be elliptical, rounded rectangular, or stadium-shaped. By a lengthways cross-section, it is meant that the cross-section is formed in a plane orthogonal to the plane of a laminate member.

The widthways cross-section of at least one of the manifold plena 146, 148 may be spherical, elliptical, rounded rectangular, stadium-shaped, or any other suitable shape. By a widthways cross-section, it is meant that the cross-section is formed in the same plane as the plane of a laminate member.

Figure 4:
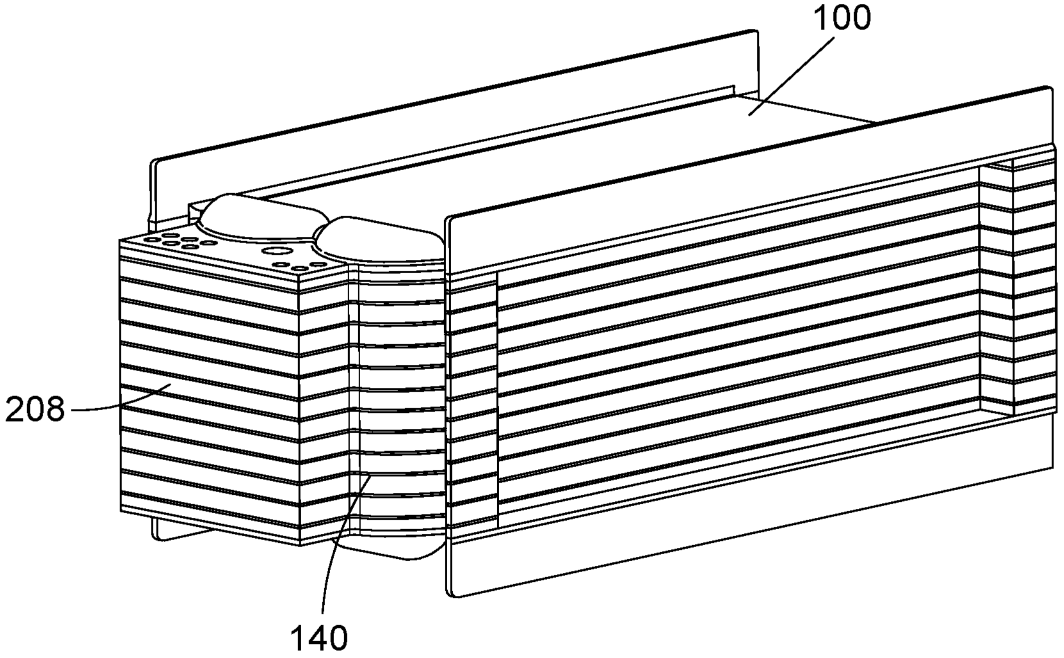
FIG. 4 shows an intermediate step in a method of forming the heat exchanger.

Turning now to FIG. 4, FIG. 4 illustrates an intermediate step in a method of manufacture of the heat exchanger 1. A method of forming the heat exchanger 1 comprises: forming a core 100; forming a void 141 in the core 100; providing end caps 150 to seal the void 141, wherein the void 141 and the end caps 150 together form a manifold 140, and wherein at least one of the end caps 150 is a non-flat end cap 152. The core 100 is formed by stacking together laminate members and then brazing them together.

The laminate members 110, 120, 132, 134, 136 may be formed by cold forming, hydroforming, additive manufacturing, subtractive manufacturing, or any other suitable forming method. Laminate members 110, 120, 132, 134, 136 may be formed with extensions 206, as shown on the end plates 110, 120 in FIG. 2. When laminate members 110, 120, 132, 134, 136 are stacked in the desired configuration, the extensions line up to form an extension block 208. The laminate members 110, 120, 132, 134, 136 are formed such that, when they are stacked, the manifold 140 is formed as a void 141 within the stack 130.

The laminate members 132, 134, 136 also comprise flange portions which align to form parts of the flange 200 on the first side 106 and the second side 108 of the stack 130. The flange 200 is completed by flange sections 202, 204 on the end plates 110, 120.

The end caps 150 are formed as protrusions on the end plates 110, 120 such that the end caps 150 protrude above a main plane of the end plate 110, 120. The flange sections 202, 204 also protrude above the main plane of the end plate 110, 120.

After the laminate members 110, 120, 132, 134, 136 have been stacked in the desired configuration, they are joined together. The joining process may use vacuum brazing or any other suitable method.

Once the laminate members 110, 120, 132, 134, 136 have been joined together, the extension block 208 may be machined to form interface features such as the inlet 143 and the outlet 145. Depending on the machining or forming method used, additional machining may be required to remove excess material.

The void 141 can be formed by stacking laminate members 110, 120, 132, 134, 136 having a void portion, the void portion being formed during the formation of the laminate members 110, 120, 132, 134, 136. Alternatively, the laminate members 110, 120, 132, 134, 136 can be formed without a void portion with the void portion then being formed by a subtractive manufacturing step, such as by machining the stack of laminate members 132, 134, 136. In another alternative, the laminate members 132, 134, 136 are formed by additive manufacturing and have a void portion requiring additional machining to remove undesired material. The void 141 extends fully through the stack 130 and is then sealed using end caps 150 to form the manifold 140.

What is claimed is:

1. A method of forming a heat exchanger, the method comprising:

forming a core, wherein the core comprises a plurality of stacked laminate members, wherein the plurality of laminate members comprises a plurality of fluid enclosures arranged to at least partially define at least one flow path, at least one separating plate for separating each of the plurality of fluid enclosures, a base plate, and a top plate, wherein the base plate and the top plate are end plates of the core, the base plate being a first plate of the core and the top plate being a last plate of the core;

providing a void within the core, wherein the void extends fully through the plurality of laminate members; and using end caps to seal the void, wherein the void and the end caps together form a manifold, and wherein at least one of the end caps is a curved non-flat end cap that forms a curved end of the manifold.

2. The method of claim 1, wherein the heat exchanger is a laminate heat exchanger, and wherein forming the core includes stacking the plurality of laminate members.

3. The method of claim 2, wherein the at least one curved non-flat end cap is ellipsoidal, torispherical, hemispherical, or any other curved shape.

* * * * *